United States Patent
Koyano et al.

[11] Patent Number: 6,055,868
[45] Date of Patent: May 2, 2000

[54] ULTRASONIC FLOW METER

[75] Inventors: Kiyoshi Koyano; Yoshiko Usui; Tadashi Ikawa, all of Yokohama; Tokio Sugi, Tokyo, all of Japan

[73] Assignees: Tokyo Keiso Kabushiki-Kaisha, Tokyo; Kabushiki-Kaisha Izumi Giken, Kanagawa-ken, both of Japan

[21] Appl. No.: 08/949,923

[22] Filed: Oct. 14, 1997

[51] Int. Cl.$^7$ ...................................................... G01F 1/66
[52] U.S. Cl. ............................................................ 73/861.28
[58] Field of Search ........................... 73/862.27, 862.28, 73/862.29

[56] References Cited

U.S. PATENT DOCUMENTS

| | | | |
|---|---|---|---|
| 3,357,243 | 12/1967 | Woodcock | 73/861.27 |
| 3,987,674 | 10/1976 | Baumoel | 73/861.28 |
| 4,003,252 | 1/1977 | Dewath | 73/194 A |
| 4,164,865 | 8/1979 | Hall et al. | 73/861.28 |
| 4,286,470 | 9/1981 | Lynnworth | 73/861.28 |
| 5,001,936 | 3/1991 | Baumoel | 73/861.28 |
| 5,131,278 | 7/1992 | Baumoel | 73/861.28 |
| 5,594,181 | 1/1997 | Stange | 73/861.28 |

*Primary Examiner*—Benjamin R. Fuller
*Assistant Examiner*—Jewel V. Thompson
*Attorney, Agent, or Firm*—Lowe Hauptman Gopstein Gilman & Berner

[57] ABSTRACT

An ultrasonic flow meter for determining the flow rate of fluid flowing through tubings. The ultrasonic flow meter comprises a measuring tube having a diameter constant in its entire length, and two ring shaped oscillators disposed longitudinally along the tube so as to substantially intimately contact the inner peripheral surface thereof with the outer peripheral surface of the tube. The one of said two oscillators is energized by electric AC energy to generate an ultrasonic wave, and the thus generated ultrasonic wave is detected by means of the other oscillator, and vice versa. Then the time required for propagating the ultrasonic wave from the upstream oscillator to the downstream oscillator, and that from the downstream oscillator to the upstream oscillator is measured, and the difference between the measured times is calculated by means of an arithmetric circuit to determine the velocity of the fluid flowing through the measuring tube.

9 Claims, 7 Drawing Sheets

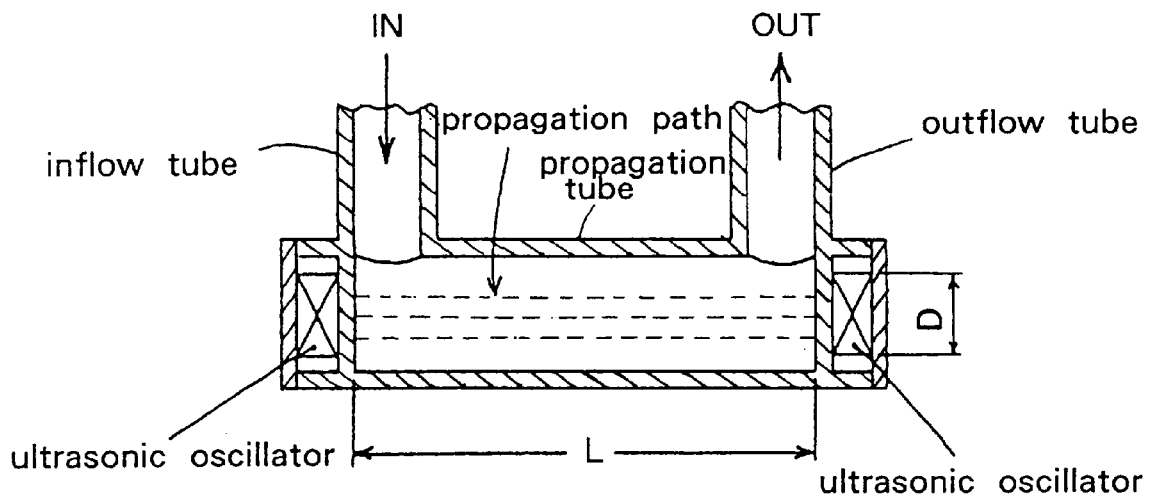
Fig. 8 (a) Prior Art
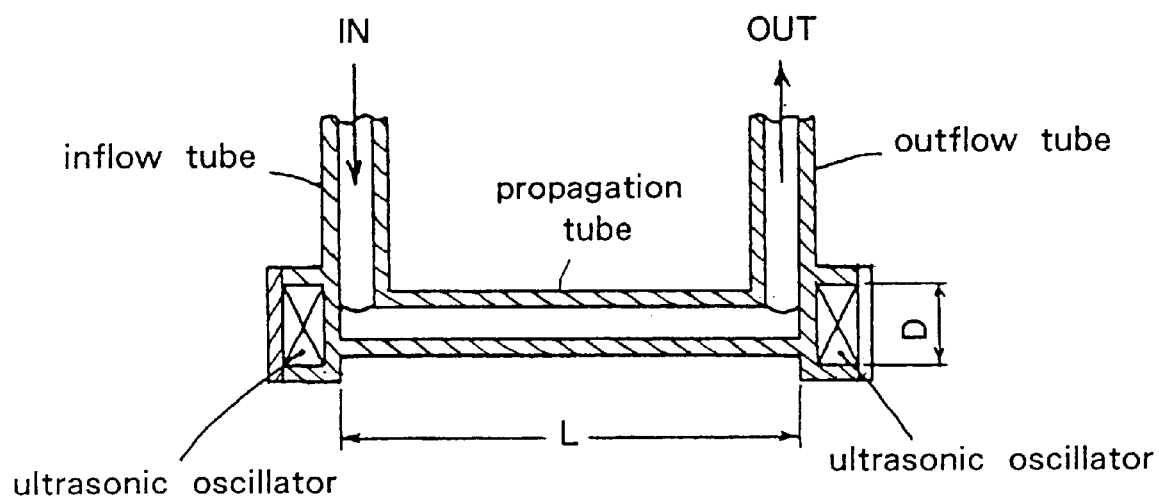
Fig. 8 (b) Prior Art

ULTRASONIC FLOW METER

FIELD OF THE INVENTION

The present invention relates to the field of flow meter and, in particular, to ultrasonic flow meters.

BACKGROUND OF THE INVENTION

An ultrasonic flow meter of the type that the generated ultrasonic wave is caused to propagete through the fluid flowing through the tublar path, the velocity of the fluid flowing through the tublar path is determined on the basis of the difference between the rate of propagation of the ultrasonic wave propagates from the upstream to the downstream and that propagates from the downstream to the upstream, and provide the flow rate of the fluid flowing through the tublar path, is referred to as an ultrasonic flow meter of the type determining the flow rate from the difference between the rates of propagation, or an ultrasonic flow meter of the type determining the flow rate from the difference between the propagation times. Such type of ultrasonic flow meter is accepted broadly in the art.

The above mentioned type of flow meter can be categorized in its structure to two generic types of flow meter.

The first type of flow meter has a straight propagation tube and a pair of ultrasonic oscillators disposed at longitudinally spaced and diametrically opposite positions on the tube so as to face each other, as shown in FIG. 6. The generated ultrasonic wave propagates obliquely to the flowing direction of the fluid fluid flowing through the tube. The ultrasonic flow meter of this type will be referred to hereinafter as "flow meter of type 1".

The second type of flow meter has a detector comprising a straight propagation tube having ultrasonic oscillators at both of its closed ends, and inflow and outflow tubes connected to the side surface of the propagation tube, as shown in FIGS. 7, 8a, and 9. The ultrasonic wave generated by means of ultrasonic oscillator will propagate in parallel with the fluid flowing through the tube. The ultrasonic flow meter of this type will be referred to hereinafter as "flow meter of type 2".

The operating priciple adopted in both of the type 1 and the type 2 is referred to as alternately operating method for measuring the difference between the rates of propagation of the ultrasonic wave. This method is adopted because of its measuring accuracy and the cost for it.

In this method, two ultrasonic oscillators are arranged so that the one of the oscillators may receive the ultrasonic wave generated by another oscillator, and vice versa. In other words, when one of the oscillators functions as an ultrasonic oscillator, the other of the oscillators functions as a receiver for the ultrasonic wave generated by means of the one oscillator, and vice versa. The flow rate can be determined by measuring the difference between the time required for propagating the ultrasonic wave from the one oscillator to the other oscillator and that from the other oscillator to the one oscillator. This difference will be referred to hereinbelow as "propagation time lag".

Each of these flow meters of the type 1 and type 2 has respective advantages and disadvantages described hereinbelow, so that these flow meters will be utilized properly for the application.

The primary feature of the flow meter of type 1 is that the components of the flow meter such as the inflow tube, the propagation tube, and the outflow tube are included in a continuous straight tube. In this connection, the flow meter of type 1 has a number of advantages such that the flow meter can be manufactured economically, the pressure loss through the flow meter is very little, the cleaning of the flow meter can easily be carried out, and so on.

However, the smaller the diameter of the tube, the smaller the distance through which the ultrasonic wave propagates, and the mesuring accuracy of the propagation time lag will be decreased accordingly. In this connection, the flow meter of type 1 is not suitable for the tubings of smaller diameter (i.e. the tubings of lower flow rate). Actually, a diameter of the tubings of the diameter in the order of 25 mm is a lower limit for the flow meter of type 1. The flow meter of type 1 will demonstrate its advantages when applied to the tubings of larger diameter.

On the other hand, the flow meter of type 2 is complex in its structure, and inferior to the type 1 in its weight, size, manufacturing cost, as well as pressure loss and cleaning ability. However, the flow meter of type 2 is suitable for the tubings of smaller diameter (i.e. the tubings of lower flow rate), because the propagation distance of the ultrasonic wave can be set irrespective of the diameter of the tubing.

In summary, the flow meter of type 1 is for the larger flow rate, whereas the flow meter of type 2 is for the smaller flow rate.

In the case of the prior flow meter of type 2 for the smaller diameter, it is necessary to set the distance between two oscillators larger than a certain distance for assuring predetermined accuracy of the flow meter. Further, the oscillatory energy larger than the predetermined value is required for propagating the detectable ultrasonic wave between the oscillators. It is, therefore, impossible to vary the length L of the propagation tube and the diameter D of the oscillator.

Although the diameter of the propagation tube can be reduced, if the diameter of the flow meter shown in FIG. 8a be reduced to the condition as shown in FIG. 8b, the percentage of the ultrasonic wave propagating through the fluid is decreased in accordance with the reduction of the diameter of the propagation tube, so that the measurement will be difficult.

The lower limit of the inner diameter of the tubing of the practically used flow meter of type 2 is in the order of 5 mm.

It is evident from the above description that the most important improvement to be made on the ultrasonic flow meter is to simplify the structure of the flow meter as the flow meter of type 1, and to make the flow meter applicable to the tubings of the smaller diameter.

OBJECT OF THE INVENTION

The object of the present invention is to provide an ultrasonic flow meter adapted to be used for the tubings of smaller diameter of the type determining the flow rate from the difference between the rates of propagation, or of the type determining the flow rate from the difference between the propagation times. The flow meter has a detector defined by a tubing of constant diameter over the entire length thereof. The flow meter to be provided has a following advantages.

(a) lower in its manufacturing cost;
(b) higher in its measuring accuracy;
(c) easy in the maintenance and cleaning;
(d) saved the space for dispose it; and
(e) light weight.

SUMMARY OF THE INVENTION

In order to achieve the above object, the ultrasonic flow meter of the present invention of the type determining the flow rate from the difference between the rates of propagation, or of the type determining the flow rate from the difference between the propagation times, wherein the generated ultrasonic wave is caused to propagete through the fluid flowing through a measuring tube, the velocity of the fluid is determined on the basis of the difference between the rate of propagation of the ultrasonic wave propagates from the upstream to the downstream and that propagates from the downstream to the upstream to provide the flow rate of the fluid flowing through the measuring tube, comprising:

a measuring tube having a uniform diameter over the entire length thereof, and two ring shaped oscillators disposed longitudinally forwardly and rearwardly along the tube so as to substantially intimately contact the inner peripheral surface thereof with the outer peripheral surface of the tube, wherein an ultrasonic wave is generated by applying electric AC energy to the one of oscillators, the thus generated ultrasonic wave is detected by the other oscillator, and vice versa, to permit and then measuring the time required for propagating the ultrasonic wave from the upstream oscillator to the downstream oscillator, and that from the downstream oscillator to the upstream oscillator, and then to calculate the difference between the measured times by means of an arithmetric circuit to determine the velocity of the fluid flowing through the measuring tube. The measuring tube may be a straight tube or a non-straight tube.

Other objects, features, and advantages will be apparent to those skilled in the art from a consideration of the following detailed description and from the accompanying drawings.

BRIEF DESCRIPTION OF THE DRAWINGS

FIG. 8a is a cross-sectional view of another embodiment of the flow meter of type 2, and FIG. 8b is an embodiment in which the diameter of the propagation tube is reduced.

DETAILED DESCRIPTION OF PREFERRED EMBODIMENTS

A preferred embodiment of the present invention will now be described with reference to FIGS. 1–5.

Figure 1:
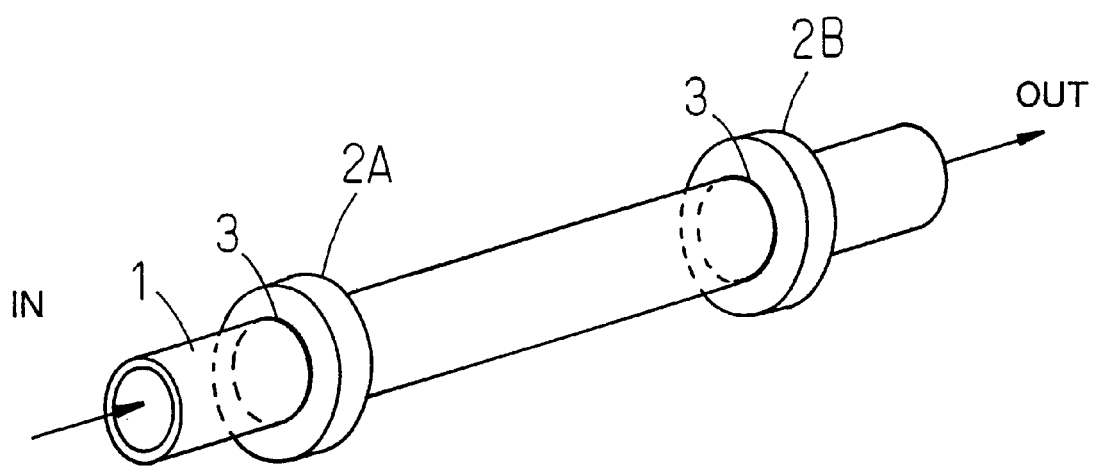
FIG. 1 is a perspective view of the ultrasonic flow meter in accordance with the first embodiment of the present invention.

In accordance with the first embodiment of the present invention, the ultrasonic flow meter has a measuring tube 1 comprising a straight tube of uniform outer diameter over the entire length thereof as can be seen from FIG. 1. Two ring shaped ultrasonic oscillators 2A and 2B having an inner diameter slightly larger than the outer diameter of the tube 1 are disposed longitudinally equally spaced on the tube 1. The clearance defined between an inner peripheral surface of each ring and an outer peripheral surface of the tube may be filled with a substance 3 for facilitating the propagation of the ultrasonic wave to achieve a so-called acoustically engaged condition. In addition, the substance 3 serves to secure the ultrasonic oscillators 2A and 2B on the tube 1.

Figure 2:
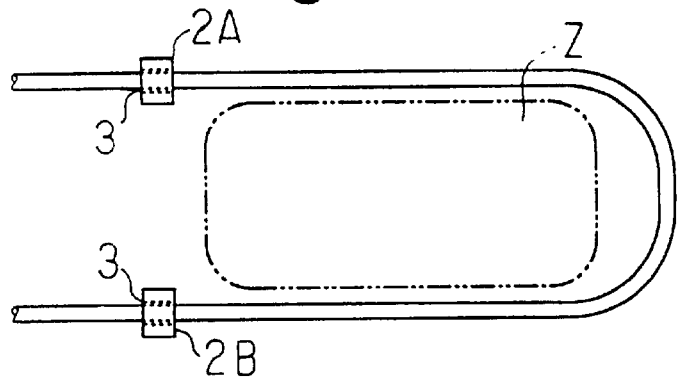
FIG. 2(a)–2(c) are views of the ultrasonic flow meter in accordance with the second embodiment of the present invention.
Figure 2:
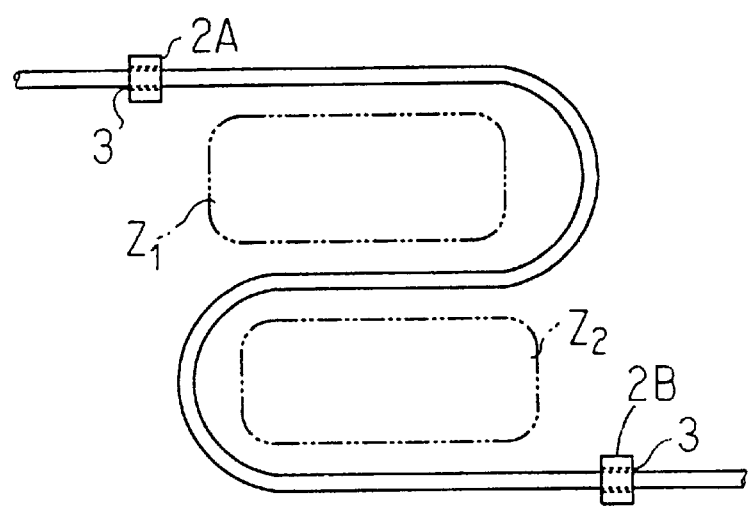
Figure 2:
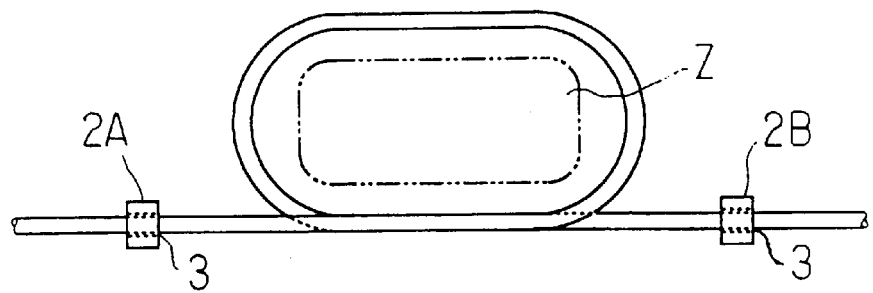
Figure 3:
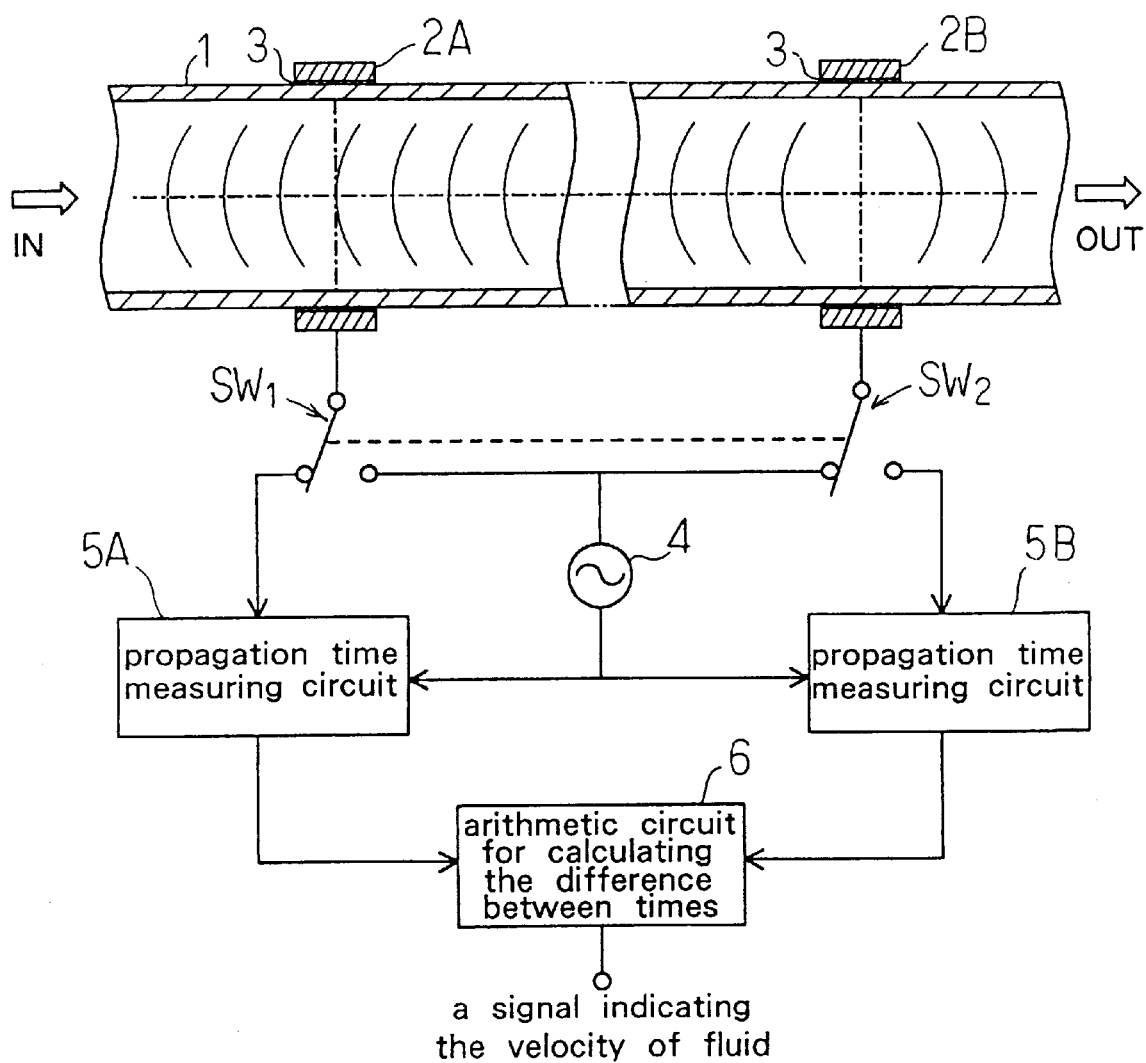
FIG. 3 is a vertical cross-sectional view of a portion of the measuring tube in which the oscillator is secured.

In accordance with the second embodiment of the present invention, the ultrasonic flow meter has a curved shaped measuring tube as shown in FIG. 2. A version in which the tube is shaped as "U" is shown in FIG. 2a, another version in which two U-shaped tubes disposed in opposite direction are connected with each other is shown in FIG. 2b, and further version in which the tube is shaped as a looped coil is shown in FIG. 2c.

In the above-mentioned arrangement, each ultrasonic oscillator will oscillate radially upon application of electric AC energy thereto, and generate electric signals similar in their form to the oscillatory wave upon radial oscillations are applied.

In carrying out the measurement, electric AC energy from an electric source 4 is applied to either one of the ultrasonic oscillators, for example, the downstream oscillator 2B to generate ultrasonic wave.

When the inner lumen of the tube 1 is filled with any fluid, the ultrasonic wave generated by the ultrasonic oscillator 2B propagates radially inwardly through the wall of the tube to the fluid, and once having reached the center of the oscillator (i.e. the center of the tube), the ultrasonic wave is deflected at right angle and propagate in parallel to the wall of the tube in both forward and rearward directions.

The ultrasonic wave is a sort of pressure oscillation, so that the radially directed pressure fluctuation will also be generated by the propagation of the ultrasonic wave. The upstream ultrasonic oscillator 2A will output the corresponding electric signals upon receiving the pressure fluctuation.

The waveform of the electric energy applied to the oscillator 2B and the electric signals output from the oscillator 2A are both input to a propagation time measuring circuit 5A to determine the time $t_1$ required for propagating the ultrasonic wave from the downstream oscillator 2B to the upstream oscillator 2A.

Then the operational mode of ganged switches SW and $SW_2$ is shifted to the other circuit to energize the upstream oscillator 2A to generate the ultrasonic wave. Thus generated wave is detected by the oscillator 2B. The time $t_2$ required for propagating the ultrasonic wave from the upstream oscillator 2A to the downstream oscillator 2B is determined by the propagation time measuring circuit 5A in a same manner as described above with reference to the determination of time $t_1$.

Figure 4:
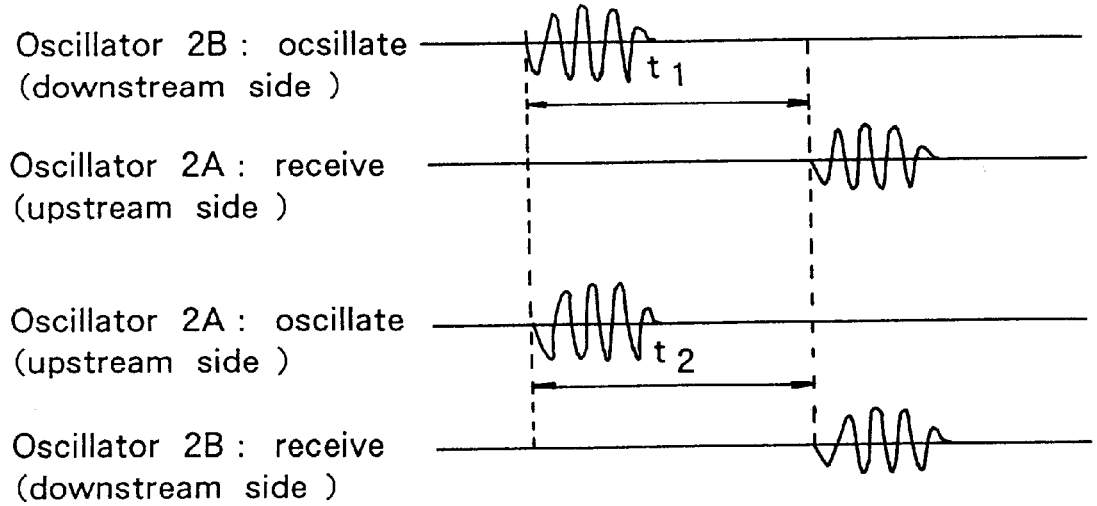
FIG. 4 is a view showing the relation in time series while the fluid within the flow meter is stational between AC voltage energizing either one of the oscillators and electric signals detected by the other oscillator.
Figure 5:
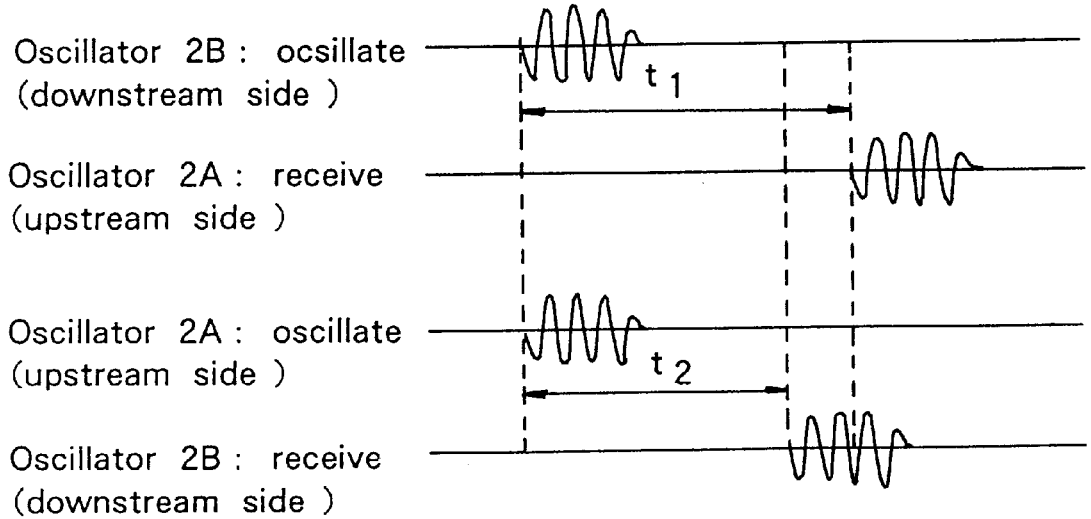
FIG. 5 is a view showing the relation in time series while the fluid within the flow meter is flowing therethrough between AC voltage energizing either one of the oscillators and electric signals detected by the other oscillator.
Figure 6:
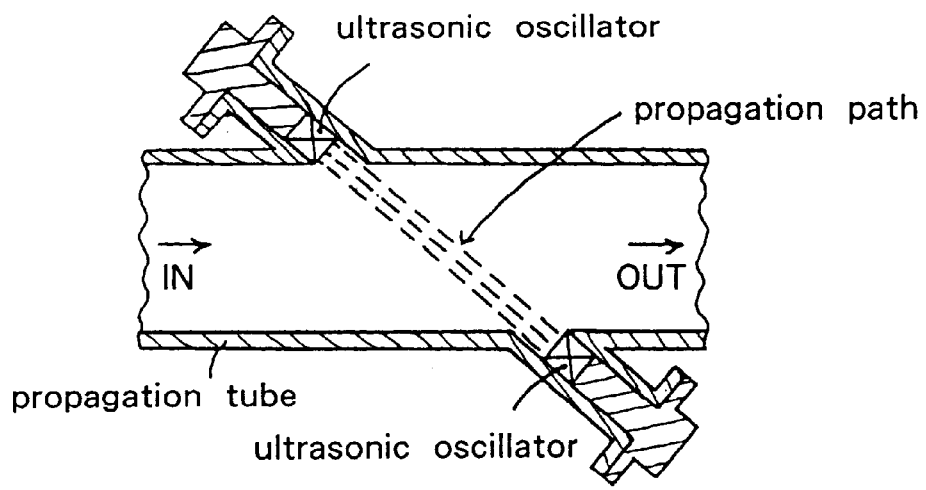
FIG. 6 is a cross-sectional view of the flow meter of type 1 in accordance with the prior art.
Figure 7:
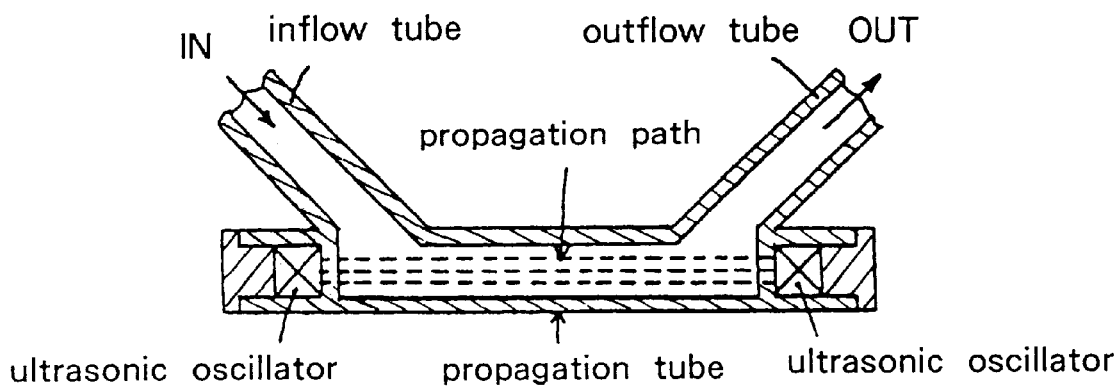
FIG. 7 is a cross-sectional view of the flow meter of type 2 in accordance with the prior art.
Figure 9:
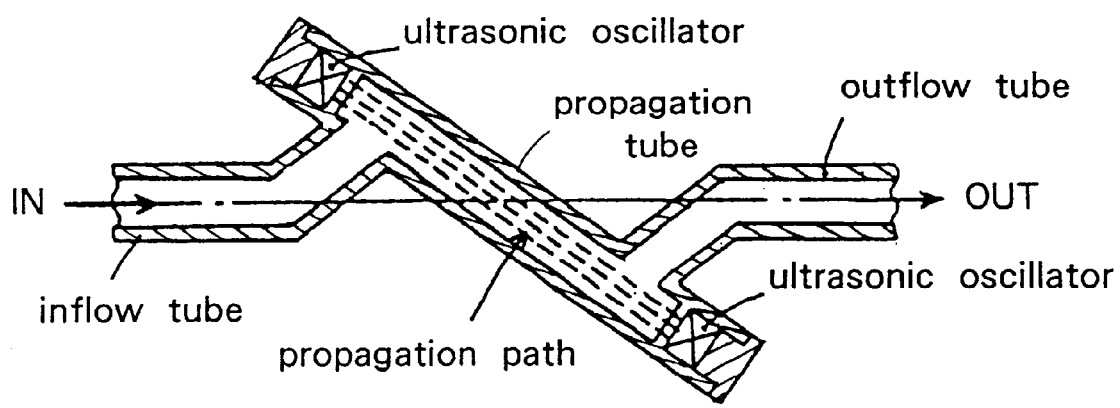
FIG. 9 is a cross-sectional view of the further embodiment of the flow meter of type 2.

When the fluid within the measuring tube is stational (i.e. the flow rate of the fluid within the tube is equal to zero), the rate of propagation of the ultrasonic wave through the fluid within the measuring tube is constant, so that the time $t_1$ is equal to the time $t_2$ as shown in FIG. 4.

On the other hand, when the fluid within the measuring tube is flowing therethrough, the time $t_2$ required for propagating the ultrasonic wave from the upstream oscillator 2A to the downstream oscillator 2B will be decreased under the effect of the velocity of the fluid. On the contrary, the time $t_1$ required for propagating the ultrasonic wave from the downstream oscillator 2B to the upstream oscillator 2A will be increased. The velocity of the fluid flowing through the measuring tube can be obtained by calculating the difference between the times $t_1$ and $t_2$, since the difference will be increased in proportion to the velocity of the fluid.

The flow meter of the present invention determines the flow rate from the difference $t_1-t_2$ between the time $t_1$ required for propagating the ultrasonic wave from the downstream oscillator 2B to the upstream oscillator 2A and the time $t_2$ required for propagating the ultrasonic wave from the upstream oscillator 2A to the downstream oscillator 2B, so that the longer the distance between the oscillators 2A and 2B, the higher the accuracy of the measurement.

In the case of a straight measuring tube, lengthening the distance between oscillators 2A and 2B for achieving high accuracy will lead to lengthening the entire length of the flow meter in the same plane.

On the contrary, in each curved shaped measuring tube shown respectively in FIG. 2 having a bend or bends, the apparent length of the flow meter will not be increased in spite of the fact that the distance between the oscillators 2A and 2B is increased for achieving high accuracy.

Specifically, in the version as shown in FIG. 2c, a flow meter of compact configuration having sufficiently long distances between oscillators 2A and 2B for increasing the accuracy of the flow meter can be obtained by repeatedly winding the measuring tube helically.

In the case that the electric circuit for measurement can be disposed on zone Z (in the version as shown in FIG. 2b, zones $Z_1$ and $Z_2$) defined by the bend or bends of the tube, an unitary ultrasonic flow meter of very compact size having built-in electric circuit can be obtained.

In accordance with the present invention, the distance between two oscillators can be selected independently of the diameter of the tube on which the oscillators are disposed, and the ring-shaped oscillators can be manufactured to the outer diameter of the straight tube, and the flow meter can be adapted to the application in which a low flow rate of fluid passes through the measuring tube or the application in which the flow meter include a tube of smaller diameter. Further, the flow meter of the present invention will provide the advantages (a)–(e) mentioned in the section of the object of the present invention.

In accordance with the present invention, a flow meter of still a smaller diameter than the prior type 2 flow meter can be realized. This is because reducing the diameter of the tube will not decrease the percentage of ultrasonic wave propagating through the fluid within the flow meter, and there is no difficulty in manufacturing the ultrasonic oscillator of reduced diameter.

While the preferred embodiments of the invention have been illustrated and described, it will be appreciated that various changes can be made therein without departing from the spirit and scope of the invention. The embodiments shown and described are for illutrative purposes only and are not meant to limit the scope of the invention as defined by the claims.

What is claimed is:

1. An ultrasonic flow meter comprising:
   a measuring tube having a uniform outer diameter over the entire length thereof, said measuring pipe being a straight tube; and
   first and second ring shaped oscillators disposed longitudinally forwardly and rearwardly along, and externally of, an outer peripheral surface of a wall of the tube so as to substantially intimately contact inner peripheral surfaces thereof with the outer peripheral surface of the wall of tube;
   wherein the first of said two oscillators is energized by electric AC energy for generating and propagating a first ultrasonic wave radially inwardly through the wall of the tube toward a center of the tube for deflecting at the center of the tube perpendicularly to the radial direction of inward propagation and for propagating within the tube, the first ultrasonic wave being detected by the second oscillator, and wherein the second of said two oscillators is energized by electric AC energy for generating and propagating a second ultrasonic wave radially inwardly through the wall of the tube toward a center of the tube for deflecting at the center of the tube perpendicularly to the radial direction of inward propagation and for propagating within the tube, the second ultrasonic wave being detected by the first oscillator,
   the time required for propagating the ultrasonic wave from the upstream first oscillator to the downstream second oscillator being measured and the time required for propagating the ultrasonic wave from the downstream second oscillator to the upstream first oscillator being measured by measuring circuit, and the difference between the measured times being calculated by an arithmetic circuit to determine the velocity of the fluid flowing through the measuring tube.

2. The ultrasonic flow meter as defined in claim 1, wherein said first and second ring shaped oscillators surround said outer peripheral surface of the wall of the tube.

3. The ultrasonic flow meter as defined in claim 2, wherein each of said first and second ring shaped oscillators is concentric with the wall of the tube.

4. An ultrasonic flow meter comprising:
   a measuring tube having a uniform outer diameter over the entire length thereof,
   said measuring pipe being a straight tube;
   first and second ring shaped oscillators having an inner aperture of a diameter slightly larger than the outer diameter of said measuring tube, each of said oscillators is disposed along the tube longitudinally at two positions on the outer periphery of the tube respectively; and
   a substance for facilitating propagation of an ultrasonic wave being interposed between an inner peripheral surface of each oscillator and an outer peripheral surface of the measuring tube to achieve an acoustically engaged condition therebetween,
   wherein the first of said two oscillators is energized by electric AC energy for generating and propagating a first ultrasonic wave radially inwardly through a wall of the tube toward a center of the tube for deflecting at the center of the tube perpendicularly to the radial direction of inward propagation and for propagating within the tube, the first ultrasonic wave being detected by the second oscillator, and wherein the second of said two oscillators is energized by electric AC energy for generating and propagating a second ultrasonic wave radially inwardly through the wall of the tube toward a center of the tube for deflecting at the center of the tube perpendicularly to the radial direction of inward propagation and for propagating within the tube, the second ultrasonic wave being detected by the first oscillator,
   the time required for propagating the ultrasonic wave from the upstream first oscillator to the downstream second oscillator being measured and the time required for propagating the ultrasonic wave from the downstream second oscillator to the upstream first oscillator being measured by measuring circuit, and the difference between the measured times being calculated by an arithmetic circuit to determine the velocity of the fluid flowing through the measuring tube.

5. The ultrasonic flow meter as defined in claim 4, wherein the substance for facilitating the propagation of the ultrasonic wave comprises grease.

6. The ultrasonic flow meter as defined in claim 5, wherein said first and second ring shaped oscillators surround said outer peripheral surface of the wall of the tube.

7. The ultrasonic flow meter as defined in claim 6, wherein each of said first and second ring shaped oscillators is concentric with the wall of the tube.

8. The ultrasonic flow meter as defined in claim 4, wherein said first and second ring shaped oscillators surround said outer peripheral surface of the wall of the tube.

9. The ultrasonic flow meter as defined in claim 8, wherein each of said first and second ring shaped oscillators is concentric with the wall of the tube.

* * * * *

UNITED STATES PATENT AND TRADEMARK OFFICE
CERTIFICATE OF CORRECTION

PATENT NO. : 6,055,868
DATED : May 2, 2000
INVENTOR(S) : KIYOSHI KOYANO et. al.

It is certified that error appears in the above-indentified patent and that said Letters Patent is hereby corrected as shown below:

On the title page: Item [30]

Foreign Application Priority Data: Japanese Application No. 8-293338 filed October 15, 1996

Signed and Sealed this

Twentieth Day of February, 2001

Attest:

NICHOLAS P. GODICI

Attesting Officer

Acting Director of the United States Patent and Trademark Office